(12) United States Patent
Moyer

(10) Patent No.: US 6,329,918 B1
(45) Date of Patent: Dec. 11, 2001

(54) ELECTRONIC ANIMAL IDENTIFICATION TAG AND PAGER

(76) Inventor: Jerry L. Moyer, 7240 Mourning Dove Ct., Titusville, FL (US) 32780

( * ) Notice: Subject to any disclaimer, the term of this patent is extended or adjusted under 35 U.S.C. 154(b) by 0 days.

(21) Appl. No.: 09/058,819

(22) Filed: Apr. 13, 1998

(51) Int. Cl.⁷ ....................................................... H04Q 1/00
(52) U.S. Cl. ........................ 340/573.1; 340/7.1; 119/859; 381/51
(58) Field of Search ............................... 340/825.44, 573, 340/573.3, 573.1, 573.4, 7.1, 706; 119/174, 29, 720, 858, 859; 40/300, 301; 381/51

(56) References Cited

U.S. PATENT DOCUMENTS

| | | | | |
|---|---|---|---|---|
| 4,898,120 | * | 2/1990 | Brose | 119/29 |
| 5,012,229 | * | 4/1991 | Lennon et al. | 340/706 |
| 5,045,327 | * | 9/1991 | Tarlow et al. | 381/51 |
| 5,355,839 | * | 10/1994 | Mistry | 119/858 |
| 5,515,033 | * | 5/1996 | Matarazzo | 340/573 |
| 5,559,498 | * | 9/1996 | Westrick | 340/573 |
| 5,793,290 | * | 8/1998 | Eagleson | 340/573.1 |
| 5,815,077 | * | 9/1998 | Christiansen | 340/573 |
| 5,857,433 | * | 1/1999 | Files | 119/720 |

\* cited by examiner

Primary Examiner—Brian Zimmerman

(57) ABSTRACT

An electronic animal identification tag allows pet owners to select, program, and display information about the pet and its owner as a means for locating lost pets. Also, at programmable times, the tag can emit an audible signal to remind the pet's owner of events important to the pet and owner such as groomings, veterinarian appointments, feeding, or daily animal attention.

1 Claim, 4 Drawing Sheets

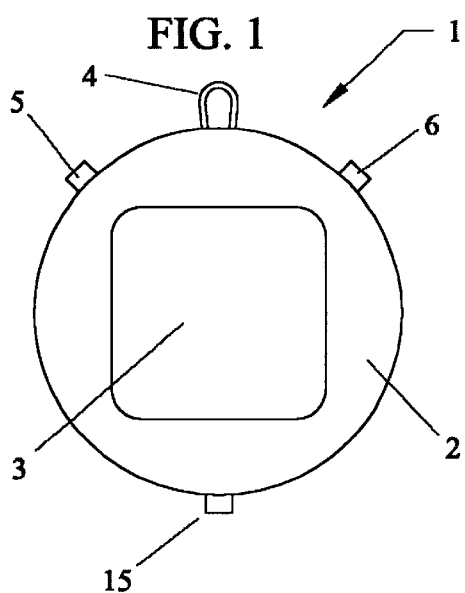
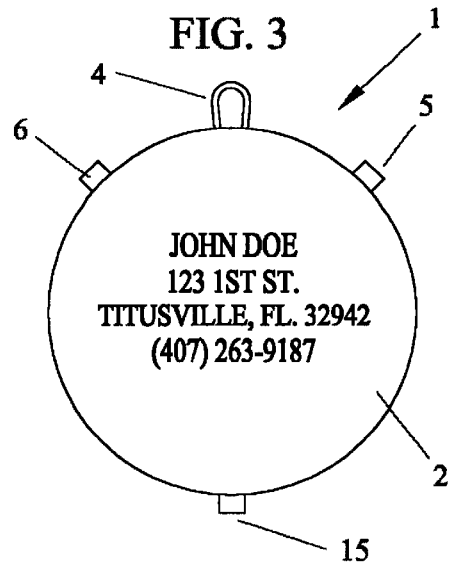
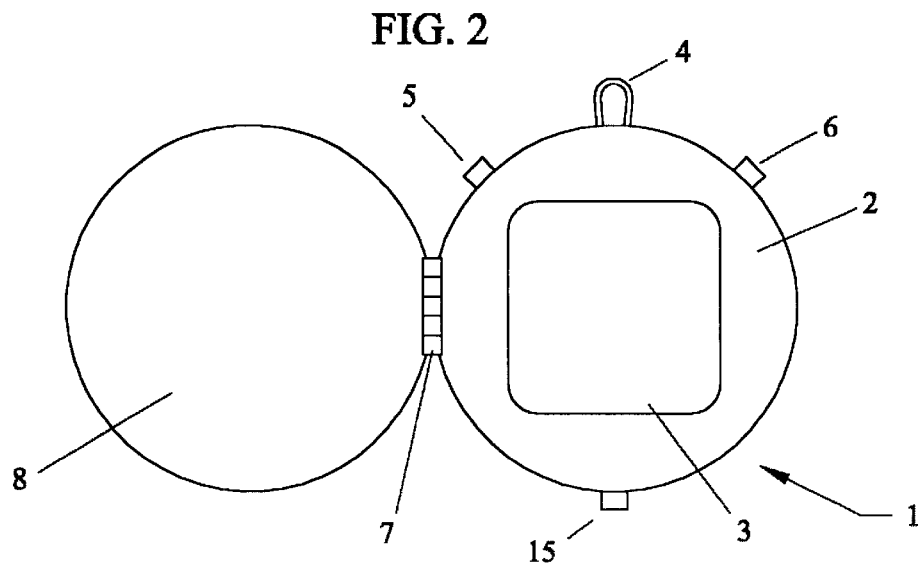

ELECTRONIC ANIMAL IDENTIFICATION TAG AND PAGER

BACKGROUND OF THE INVENTION

1. Field of the Invention

The present invention relates to identification and controlling devices for animals. More specifically, the invention relates to a device for animals, either a hanging tag or collar mounted device, which provides a means for animal identification, summoning, and owner alert/reminder functions.

2. Description of the Prior Art

Owners currently use a variety of methods to identify and control animals used for hunting, as beasts of burden, and as pets. Missing animals are difficult to recover without proper identification and/or a means of calling the animal when the animal is beyond its normal hearing range.

Simple means for animal identification are known in the prior art. The earliest means, which is still used today, involves branding or tatooing identifying information on the animal. However, this method is cruel and a limited amount of information can be conveyed in this manner.

Another simple means known in the art involves passive metal or plastic tags which are engraved with the owner's telephone number, address, or other identifying information. For household domestic animals, these devices require replacement following a change of address or telephone number which renders the old tag useless. In order that the devices not be burdensome to the animal, they are often small. The corresponding identifying text is therefore also small and difficult to read. Furthermore, the text may become worn by the normal daily activities of the animal.

A number of prior art devices have been developed which provide a means for animal identification, control, and loss prevention. Certain devices include the use of an electronic signal sending device worn by the animal for use in conjunction with a signal receiving device. Examples of such prior art devices include U.S. Pat. No. 4,617,876 to Hayes; U.S. Pat. No. 4,517,563 to Diamant; and U.S. Pat. No. 5,357,700 to Schulte.

Other prior art, which does not anticipate the present invention, includes the following:

U.S. Pat. No. 5,482,008 to Stafford discloses an electronic identification device as a bolus for administration to a ruminant animal and for retention in the rumen or reticulum. The bolus houses an electronic identification device encoded with an identification code. The identification device is not readily accessible to the animal's owner.

U.S. Pat. No. 5,016,369 to Parry and U.S. Pat. No. 5,152,249 to Howe disclose tag assemblies for placement in an animal's ear tissue. Such a means of identification is acceptable for some farm animals, but unacceptably invasive for domestic household animals.

U.S. Pat. No. 4,842,304 to Jones discloses a tag for locating, color coding, numbering and or supplying other information composed of an elastic material for use in conjunction with a lubricant fitting neck.

U.S. Pat. No. 5,461,805 to Johnson discloses an animal identification component which includes a flexible and deformable panel to minimize snagging of the tag.

SUMMARY OF THE INVENTION

The present invention is directed to an article which provides means for animal identification, command, and owner reminder/alert functions. More specifically, the present invention is directed to a programmable electronic tag which can display information; such as telephone number, address, date and time; and provide other control and display features. Other programmable features include a calendar, clock, and alarm functions that can be preset to activate on a selected date and/or time to signify a specific event. The invention further provides an electronic receiver/pager capable of being activated by a hand-held transmitter or base unit to summon the animal silently, by selected sound, or by recorded voice options.

It is accordingly one object of the present invention to provide a device for animal or object identification.

Another object of the present invention is to provide a device with means for electronically summoning or paging an animal.

A third object of the present invention is to provide a device with a means for reminding or alerting an animal's owner or caretaker of events which are important to the animal's well being, such as feeding, grooming, or a scheduled visit to the veterinarian.

BRIEF DESCRIPTION OF THE DRAWINGS

FIG. 1 is directed to a frontal view of the present invention's first embodiment.

FIG. 2 is directed to a modified form of the present invention's first embodiment.

FIG. 3 is directed to a rear view of the present invention's first embodiment.

DESCRIPTION OF THE PREFERRED EMBODIMENTS

With reference now to the drawings in which numerals represent like elements, the first embodiment of the present invention is described in FIG. 1. Electronic tag 1 is designed to be worn by dogs, cats, horses, and the like. It comprises a durable outer shell 2, which can be manufactured from plastics, metals, or similar structural materials. Shell 2 may also be manufactured from a combination of materials, such as plastic for light weight and metal for strength in selected areas of high mechanical strength. Outer shell 2 is designed to be water-tight and impact resistant. While the shell 2 described and illustrated herein for descriptive purposes as being round, shell 2 may easily be polygonal, elliptical, rectangular, oval, or other suitable shapes. Shell 2 is attached to an attachment ring 4 which may be used in conjunction with a common S-type hook or similar device (not shown) to attach said tag to an animal's collar or harness.

Figure 7:
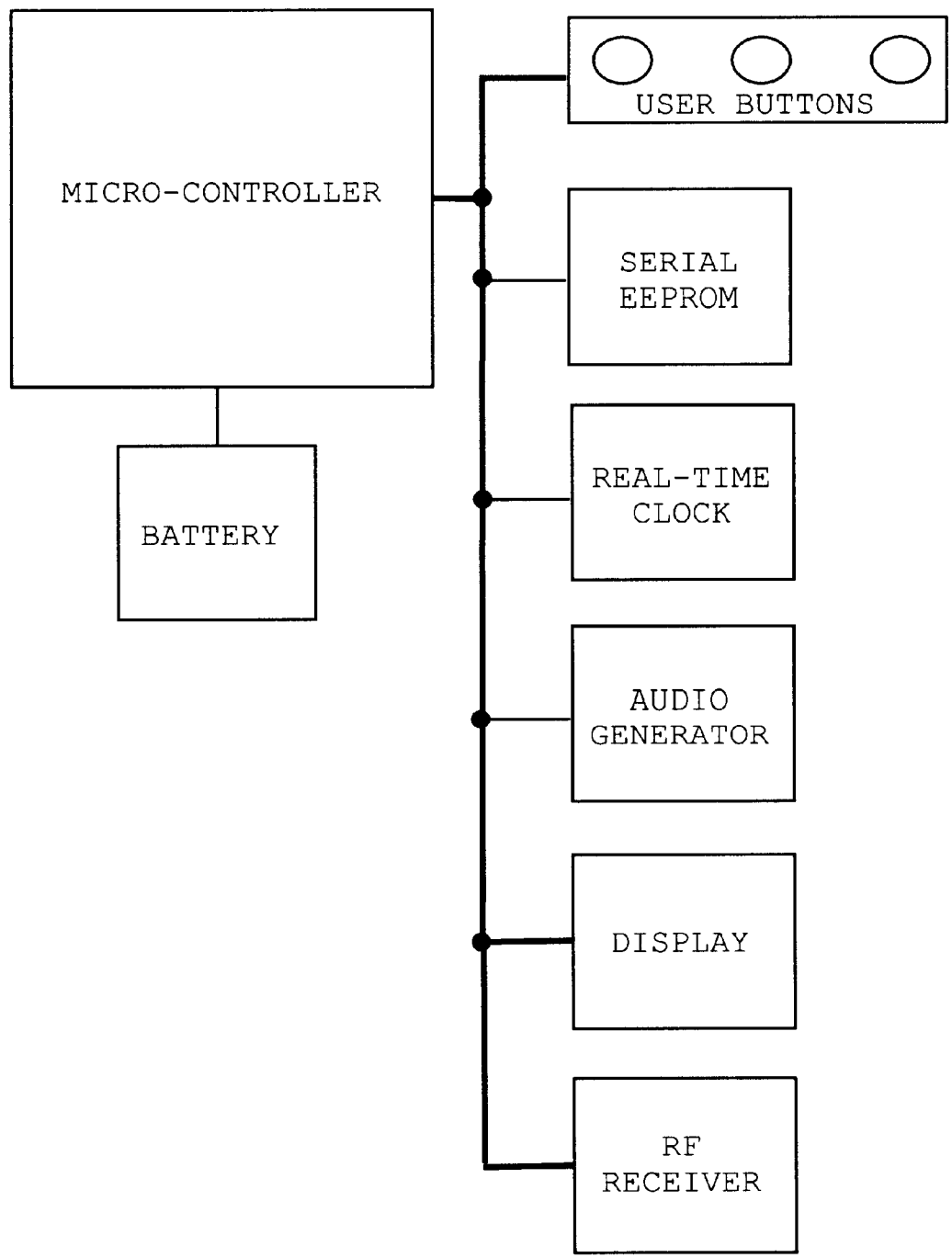
FIG. 7 describes the functional operation of the present invention.

The front face of said tag 1 comprises a large electronic display screen 3. Screen 3 may employ liquid crystal display (LCD) or other suitable technology to provide multiple lines of text and numbers in an easily readable fashion. Advance button 5 and select button 6 can be used to scroll through menu options displayed on screen 3. Set button 15 is used to program information into the identification tag. This menu-driven display technology, including the use of advance, select, and set buttons, is known in the art of digital wristwatches but has never been used in conjunction with an animal identification tag as in the present invention. The supporting electronics typically comprise a power source, such as a small battery or solar cell, and circuits contained within shell 2. FIG. 7 summarizes the aforementioned electronic elements in their functional form.

FIG. 2 is directed to a modified form of the present invention's first embodiment wherein screen 3 is protected from impact by a protective cover 8. Cover 8 is attached to shell 2 via a hinge 7. Cover 8 may further be manufactured from any of plastic, metal, or similar structural materials known in the art. Cover 8 can particularly be manufactured from clear plastic, making it possible to view display 3 without removing said cover.

FIG. 3 is directed to the rear view of the present invention's first embodiment. The rear exterior of outer shell 2 may be engraved with identifying information, such as the owner's name, telephone number and address. Such redundant information would prove useful in the event that the battery or electronics fail, making it impossible to obtain the same information from screen 3, or if someone who is unfamiliar with an electronic identification tag should find a stray animal and wish to return the animal to its owner.

Figure 4:
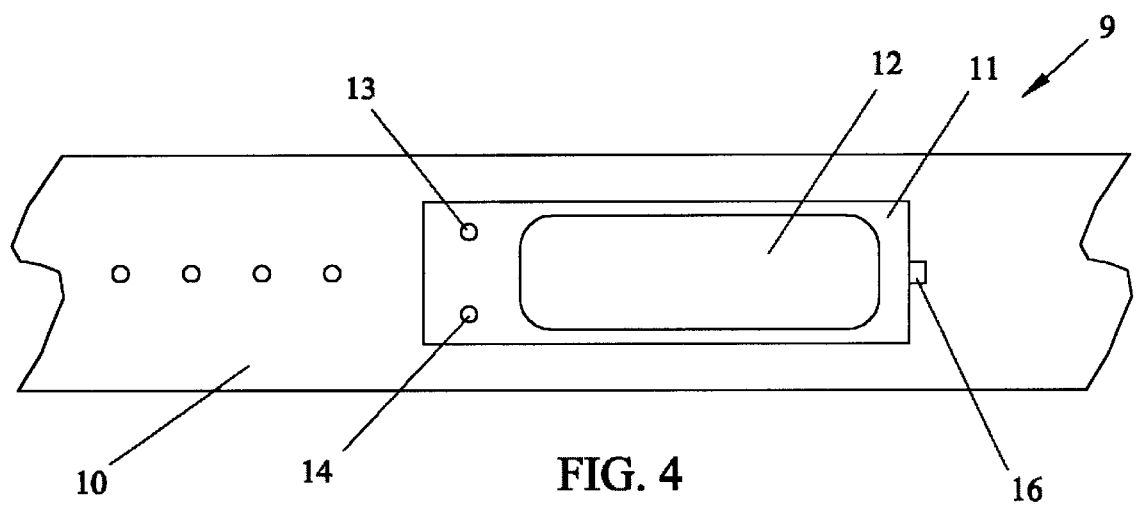
FIG. 4 is directed to a frontal view of the present invention's second embodiment.
Figure 5:
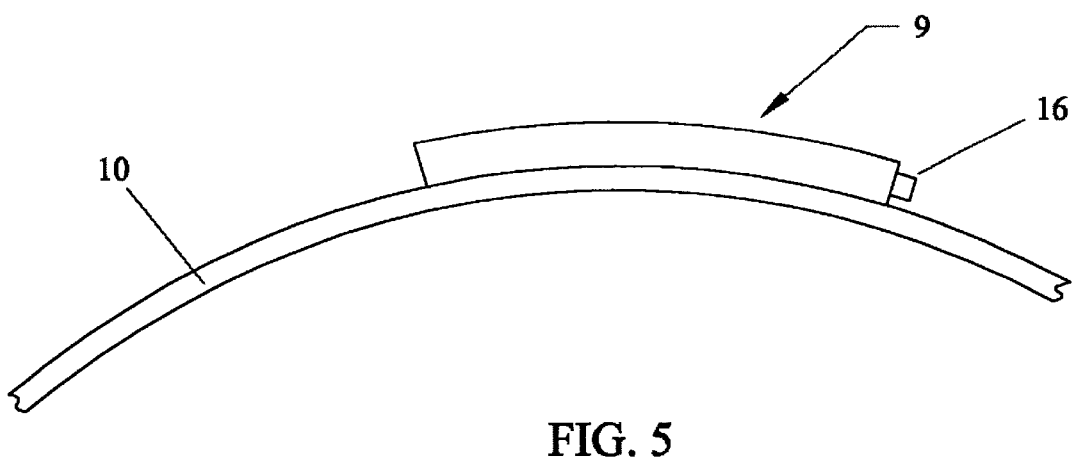
FIG. 5 is directed to a side view of the present invention's second embodiment.

FIG. 4 is directed to a second embodiment of the present invention wherein electronic identification tag 9, instead of hanging from a collar or harness, is attached to and integral with said collar or harness 10. FIG. 5 describes a side view of the same second embodiment. In said second embodiment, tag 9 comprises a thin shell 11 with display screen 12, select button 13, advance button 14, and set button 16. Said first and second embodiments of the present invention are functionally equivalent in all respects except for their different means for attachment to the collar or harness of an animal.

Figure 6A:
FIG. 6a describes the main menu display of the present invention.

The menu-driven displays for identification tags 1 and 9 are described in FIGS. 6a–f. FIG. 6a is directed to the main menu display. Five menu options are contemplated: pet's name, owner information, date/time, event, and pager mode. By repeatedly pressing advance button 5, a user can highlight successive options in the main menu shown on display 3. When the desired menu is indicated, either by a moving highlight or a moving prompt, select button 6 is pressed to select that option. Once an option is selected, the associated subpage will be shown on display 3.

Figure 6B:
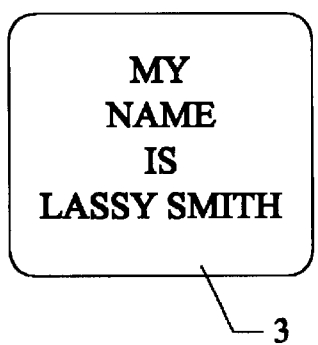
FIG. 6b describes the pet name display of the present invention.

If "pet's name" is selected, the pet name subpage will be displayed as shown in FIG. 6b. The pet owner may enter the animal's name by pressing set button 15, which will make the first letter of the pet's name flash. Pressing the advance button 5 will scroll the display through the alphabet. Pressing the select button 6 will fix the current letter of the name and advance to the second letter of the name. By repeatedly selecting and advancing, an entire name can be entered. When finished, the pet owner must press the set button 15 again to complete the task. Pressing the select button 6 again will return to the main menu shown in FIG. 6a.

Figure 6C:
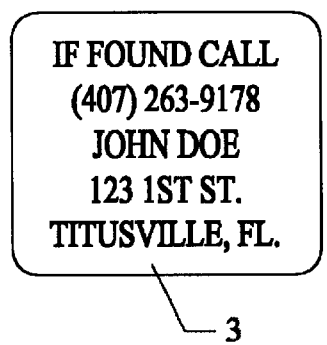
FIG. 6c describes the owner information display of the present invention.

If "owner info" is selected from the main menu shown in FIG. 6a, the owner information subpage will be displayed as shown in FIG. 6c. If the owner desires to set or change information on this subpage, the same use of the set button 15, advance button 5, and select button 6, as described previously, are employed to make the changes. When finished, the pet owner must press the set button 15 again to complete the task. As before, pressing the select button 6 at the conclusion of the task will return to the main menu shown in FIG. 6a.

Figure 6D:
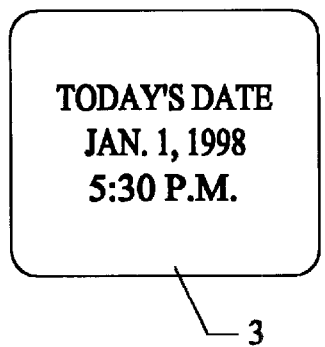
FIG. 6d describes the date and time display of the present invention.

If "date/time" is selected from the main menu shown in FIG. 6a, the date/time subpage will be displayed as shown in FIG. 6d. As before, if the owner desires to set or change information on this subpage, the same use of the set button 15, advance button 5, and select button 6, as described previously, are employed to make the changes. Also as before, pressing the set button 15 again completes the task, and pressing the select button 6 at the conclusion of the task will return to the main menu shown in FIG. 6a.

Figure 6E:
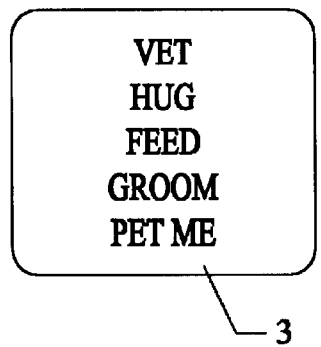
FIG. 6e describes the event menu of the present invention.

If "event" is selected from the main menu shown in FIG. 6a, the event submenu will be displayed as shown in FIG. 6e. Five typical submenu choices are contemplated: veterinarian, hug, feed, groom, and pet me. By repeatedly pressing advance button 5, a user can highlight successive options in the event submenu shown on display 3. When the desired menu is indicated, either by a moving highlight or a moving prompt, select button 6 is pressed to select that option. Once an option is selected, a time and date will be shown on display 3. As before, if the owner desires to set or change information on this subpage, the same use of the set button 15, advance button 5, and select button 6, as described previously, are employed to make the changes. Also as before, pressing the set button 15 again completes the task, and pressing the select button 6 at the conclusion of the task will return to the event submenu shown in FIG. 6e; pressing select button 6 again will return to the main menu shown in FIG. 6a.

Events set in this manner are used to remind an owner to perform certain functions for the pet. When the preset time and date are met, the identification tag emits an audible signal for a period of time. The tag may also flash what event the owner has programmed, such as "feed", on display 3. This function can be invaluable to elderly owners or busy families who might otherwise neglect necessary procedures which are critical to the pet's health and well being.

Figure 6F:
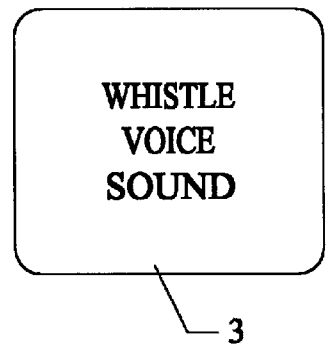
FIG. 6f describes the pager mode display of the present invention.

If "pager mode" is selected from the main menu shown in FIG. 6a, the pager mode submenu will be displayed as shown in FIG. 6f. The owner is presented with a list of optional sounds which can be emitted from the identification tag as a signal to the animal. To change the selection on this subpage, the same use of the set button 15, advance button 5, and select button 6, as described previously, are employed to make the changes. As before, pressing the set button 15 again completes the task, and also as before, pressing the select button 6 at the conclusion of the task will return to the main menu shown in FIG. 6a.

With the pager signal set, the pet owner utilizes a handheld transmitter (not pictured) similar to a garage door opener or the short-range paging devices used by restaurants to indicate seating readiness to patrons. The owner depresses a button on the transmitter, sending a signal to the identification tag. A pager receiver in the tag receives the signal and forwards the signal to the internal electronics. The tag then responds by generating the predetermined sound. Because of the close proximity between the tag and the animal's ears, assuming the tag is located on a collar or harness, the sound need not be very loud. The clear advantage is that only a small battery is required to power both the electronics and the audible signal generator, making the tag lightweight and uncumbersome.

FIGS. 6a–f describe typical types of information and subpages. However, they are not meant to be limiting, and the present invention clearly anticipates and includes the possibility of more or less display options. The display options are limited only by ease of use and capacity of the electronics which govern the information.

Furthermore, entering information into the present invention requires the use of a combination of buttons known in the art. However, the identification tag of the present invention could easily be fitted with an electronic data port which would enable a user to enter information more easily via the use of a personal computer and data cable.

The present invention could also be expanded to include an advanced pager system capable of issuing several different commands from the hand-held transmitter. These commands would cause the identification tag to emit different sounds identifying those commands to the animal.

What is claimed is:

1. An electronic animal identification tag comprising:
   an outer shell, an attachment device, an electronic display screen, at least three programming buttons, an electrical power source, programmable electronics, an audible signal generator, and a pager receiver;
   wherein said power source and programmable electronics are located inside said outer shell;
   wherein said programming buttons and said attachment device are located on the external surface of said outer shell;
   wherein said display screen is capable of presenting information comprising text and numbers to an operator;
   wherein said control buttons can be used to select options from menus and submenus of options which are presented on said screen and generated by said programmable electronics;
   wherein said control buttons can be used to enter data which is presented on said screen and stored by said programmable electronics;
   wherein said data consists of pet name; owner name, address, and telephone number; date, time; times for pet owners to conduct specific activities; and a pet command;
   wherein said attachment device is used to attach said outer shell to an animal's collar or harness via a mechanical link;
   wherein said audible signal generator is activated by an electrical signal from said programmable electronics on the basis of said data;
   wherein said signal generator activation may result from an autonomous response of said programmable electronics to said data indicating times for said pet owner to conduct specific activities;
   wherein said pager receiver is capable of receiving a signal issued manually from a hand-held transmitter, wherein upon receipt of a signal issued from said transmitter, said tag emits a predetermined audible command from said audible signal generator to the animal wearing said tag;
further comprising animal ownership information engraved on the back side of said outer shell.

* * * * *